(No Model.)
G. R. PEARE.
ROPE OR CORD FASTENING.
No. 320,959. Patented June 30, 1885.
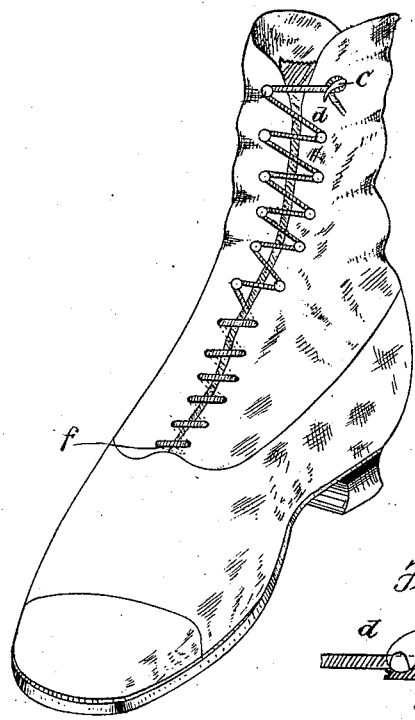
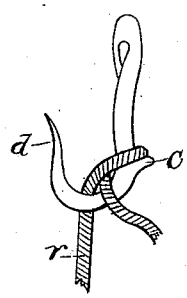
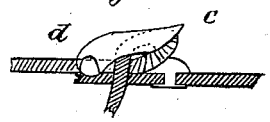
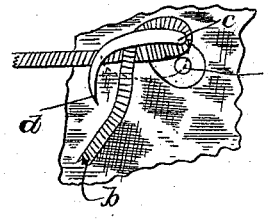
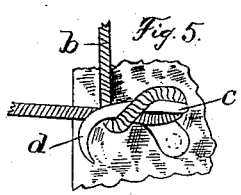
Witnesses
A. L. White
R. J. Powers
Inventor
Geo. R. Peare
per Wright & Brown
Attorneys.

UNITED STATES PATENT OFFICE.

GEORGE R. PEARE, OF LYNN, MASSACHUSETTS.

ROPE OR CORD FASTENING.

SPECIFICATION forming part of Letters Patent No. 320,959, dated June 30, 1885.

Application filed January 29, 1885. (No model.)

*To all whom it may concern:*

Be it known that I, GEORGE R. PEARE, of Lynn, in the county of Essex and State of Massachusetts, have invented certain Improvements in Rope or Cord Fastenings, of which the following is a specification.

This invention has for object to provide an improved device for securing the end of a rope or cord, and particularly the end of a shoe-lacing, although the invention is not confined to this use, but may be used for other purposes.

The invention consists in a hook having a projection on its rear or outer side adapted to support the loop of a cord passed around it, as I will now proceed to describe.

Of the accompanying drawings, forming a part of this specification, Figure 1 represents a perspective view of a hook, such as is used in hoisting. Fig. 2 represents a laced boot provided with a cord-fastening device embodying my invention. Figs. 3, 4, and 5 represent views of different forms in which my improved device may be made.

The same letters of reference indicate the same parts in all the figures.

In carrying out my invention I provide a hook or hook-shaped device, $d$, having at its rear side a projection, $c$, so arranged that when a cord or rope, $r$, is passed around the hook the projection will not slip on the hook when strain is exerted on the rope or cord. The portion of the cord on which strain is exerted is thus enabled to bind and hold the free end of the cord against the hook when laid over the latter, as shown in Fig. 1, or when placed inside and arranged to press the free end outwardly against the hook, as shown in Figs. 3, 4, and 5.

Fig. 1 shows the improvement as applied to a hook for hoisting-tackle, (this method of laying a rope over a hook, shown in this figure, is old among seamen, known as a "caric-bend" or "blackwall-hitch," see page 1,240 Knight's Mechanical Dictionary;) but by the use of the projection $c$, I am able to lay the bend while there is a strain on the rope, whereas heretofore the slack part or cord must be laid over first, and the end that receives the weight or strain carried around the back of hook and over slack end last. It will be seen, therefore, that with the old method the knot must be made while the rope is slack, and consequently cannot be used to draw a rope or cord taut and make it fast in that position, as can be done with mine, while with my improvement the rope is passed over the hook around the back above the projection $c$, the free end passing under the part under strain and over the hook again. Any strain on the main part of the rope will bind the end, as in the caric-bend, which I by my invention have reversed the tying of.

Figs. 4 and 5 show the hook laid on its side, with a suitable means of making it fast to a flat surface—as a piece of leather—so as to hold a cord or shoe-lacing. In this case the end is passed under the hook around under projection $c$, and again under the hook between the latter and the main portion of the cord, or over and under. In this case the projection or spur $c$ is located at the side of the hook instead of at the back, as in Fig. 1, as the point $c$ would not be so accessible were it left flat on the material.

To guard against any tendency of the hook and the projection $c$ catching on the clothing when used on shoes, &c., the parts may be filled in between $d$ and $c$, as shown in Figs. 3 and 4, thereby doing away with points and forming an elliptical-shaped top.

To hold the end of the lace in the lower eyelet, I flatten the metallic tongue on the end of the lace and allow it to lie between the quarter and the eyelet-strip and the tongue, where it is confined when the parts are kept together, as it must pass through eyelet at about a right angle to the surface in which the eyelet is inserted. The flatness of the tongue prevents any discomfort to the wearer.

I claim—

1. A cord or lacing fastener composed of a hook and having a projection, $c$, just in rear of the main bend and pointing relatively to said bend in reverse direction from the point of the hook, as set forth.

2. The combination, with a shoe, of a cord-fastening hook secured thereto at or near the head of the hook, said hook having the projecting point *d* a little way from the side of the shoe and having the projection *c* at the rear of the bend extending in reverse direction from point *d*, substantially as described.

In testimony whereof I have signed my name to this specification, in the presence of two subscribing witnesses, this 24th day of January, 1885.

GEO. R. PEARE.

Witnesses:
C. F. BROWN,
R. J. POWERS.